United States Patent [19]

Balousek

[11] 4,053,230
[45] Oct. 11, 1977

[54] FULL-WIDTH FILM-SUPPORTING, DRIVING, AND STRIPPING ARRANGEMENT FOR MOTION PICTURE FILM PRINTING MACHINES

[76] Inventor: Ronald R. Balousek, Bloomfield Hills, Mich. 48013

[21] Appl. No.: 722,746

[22] Filed: Sept. 13, 1976

[51] Int. Cl.² .......................................... G03B 27/22
[52] U.S. Cl. .................................... 355/104; 355/111
[58] Field of Search ..................... 355/104, 106–111

[56] References Cited

U.S. PATENT DOCUMENTS

| 2,552,255 | 5/1951 | Capstaff | 355/111 |
| 3,382,787 | 5/1968 | Jeffee et al. | 355/111 |
| 3,715,159 | 2/1973 | Allport | 355/110 |
| 3,970,386 | 7/1976 | Wohlrab | 355/111 |

*Primary Examiner*—Richard L. Moses
*Attorney, Agent, or Firm*—Willis Bugbee

[57] ABSTRACT

The present invention replaces the film supporting and stripping arrangement in the most widely-used conventional motion picture film printing machine with a film driving sprocket and a combined supporting and stripping drum which drive and fully support both the superimposed negative film and copy film throughout their entire widths and prevents them from moving apart from one another as they pass through the exposure zone wherein the exposure light passes through the two films but not beyond the combined supporting and stripping drum which obstructs the further passage of the light so that it is either reflected or deflected backward from the drum. While they are passing through the exposure zone, the two films are driven by a single toothed sprocket which maintains them in synchronism while the stripping drum supports them throughout their entire width and thus prevents the intermittent separation of the negative film and copy film in the exposure zone occurring in conventional machines wherein the films are supported only at their opposite edges, and consequently prevents the lack of sharp definition in the copy film caused by such intermittent separation.

7 Claims, 3 Drawing Figures 4,053,230

FULL-WIDTH FILM-SUPPORTING, DRIVING, AND STRIPPING ARRANGEMENT FOR MOTION PICTURE FILM PRINTING MACHINES

BACKGROUND OF THE INVENTION

In the conventional motion picture printing machine most frequently used, the exposure light beam passes through the superimposed negative film and copy film travelling at high speed through that beam and beyond them between axially-spaced stripping wheels and sprockets. As a consequence, the negative film and copy film are maintained in constant contact with one another only adjacent their opposite edges because their central portions must remain unobstructed by such stripping wheels and sprockets in order to permit passage of the exposure light beam after its passage through the two films. As a consequence, the major portions of the two films are free to move apart relatively to one another and do so intermittently, thereby resulting in indistinct printing and consequent fuzziness of image on the copy film during the periods in which it and the negative film have moved apart from one another throughout most of their widths.

SUMMARY OF THE INVENTION

The full-width film-supporting and stripping arrangement of the present invention suppresses this intermittent separation of the negative film and copy film by supporting both films throughout their entire widths at their areas of contact in the exposure zone by supporting the two films at that location by a rotary film supporting and stripping drum extending the entire width of the films except for an edge portion occupied by a drive sprocket, the teeth of which engage the edge perforations of the films. The film supporting and stripping drum is mounted on an axis of rotation which is in spaced parallel relationship to the axis of rotation of the drive sprocket and is of larger diameter than the drive sprocket, with the result that it not only supports the two films throughout their entire width and arcuate lengths within the exposure zone, but also serves as a stripping drum which separates the two films after they leave the exposure zone.

Figure 1:
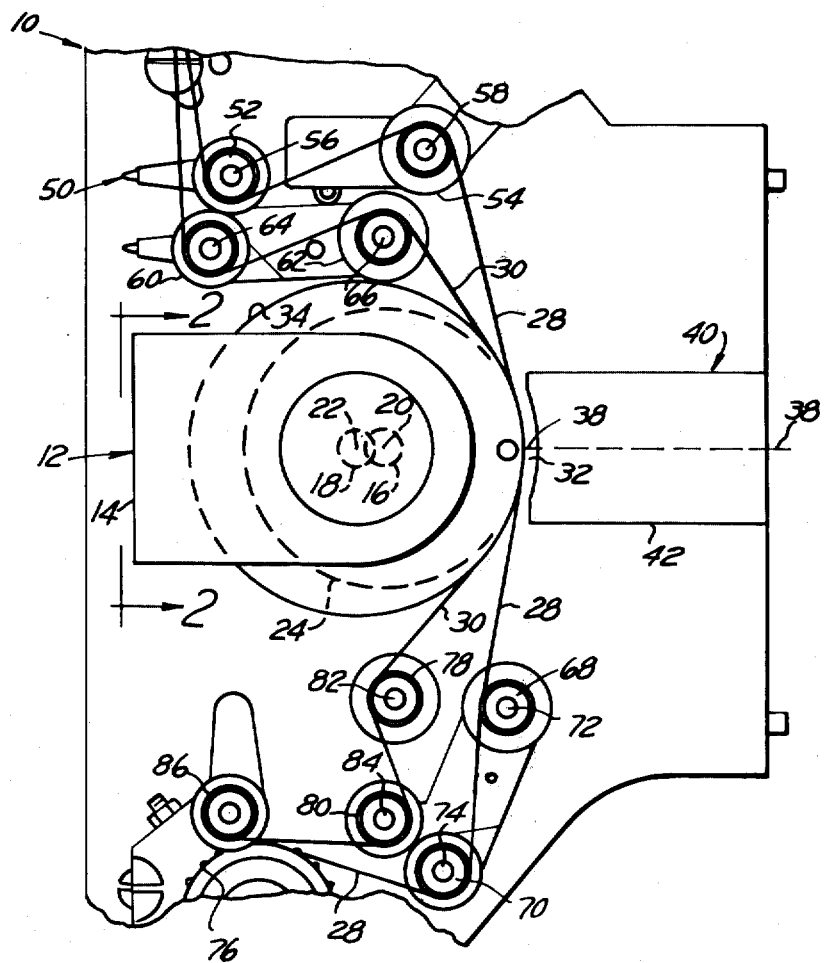
FIG. 1 is a diagrammatic fragmentary side elevation of a conventional motion picture copying machine provided with the full-width film-supporting and stripping arrangement of the present invention, omitting the conventional upper and lower portions of the machine containing the film-supplying and film-receiving reels respectively.

Referring to the drawing in detail, FIG. 1 shows in side elevation the central portion of a conventional motion-picture printing machine, generally designated 10, all but the central portion 12 of which machine is manufactured by Bell & Howell Company of Chicago, Ill., and is used by the great majority of film printing establishments in the United States. The uppermost and lowermost portions of the machine shown in FIG. 1 have been omitted because they are conventional, well-known to those skilled in the motion picture art, and form no part of the present invention. In FIG. 1, however, the conventional mechanism and optical system for supporting, stripping, and exposing the films have been removed and replaced by the full-width film-supporting and stripping arrangement, generally designated 12, of the present invention. The arrangement 12 provides an arrangement-carrying structure 14 within which are mounted two spaced parallel shafts 16 and 18 disposed on spaced parallel first and second axes 20 and 22 respectively.

Mounted on and drivingly connected to the film drive shaft 16 is a film drive sprocket 24, the teeth 26 of which mesh with the edge perforations (not shown) of the negative film 28 and positive copy film 30 at their point of superimposition in the exposure zone 32 of the arragement 12 in the machine 10. Mounted for free rotation on the shaft 18 is a full-width film-supporting and stripping drum or wheel 34. The drum 34, as its alternative names signify, supports the superimposed film 28 and positive copy film 30 throughout their entire widths and arcuate lengths within the exposure zone except for their perforated edge portions driven by the sprocket wheel 24. The drum 34 by reason of its larger diameter and different axis of rotation 22 also separates of "strips" the copy film 30 from the negative film 28 after both films 28 and 30 have passed through the exposure zone 32 while in contacting engagement with one another. By reason of the presence of the cylindrical periphery 36 of the opaque supporting drum 34, directly in line with the optical axis 38 of the optical illuminating system 40, the exposure light passes from the optical illumination system 40 through the exposure zone 32 and through the superimposed negative and copy films thereat, after which this light is obstructed from passing further onward and instead rebounds from the supporting drum periphery 36 and is reflected or diffused back toward the optical illumination system 40 from which it came.

The illumination system 40 which projects an exposure light beam along the optical axis through the exposure zone 32 onto the superimposed negative and copy films 28 and 30 respectively as they travel through the exposure zone 32 while supported throughout substantially their entire widths and arcuate lengths therein upon the cylindrical periphery 36 of the combined supporting and stripping drum 34 is conventional and is therefore believed to require no detailed description. The illumination system 40 is mounted in a housing 42 and consists, as usual, of a light source (not shown), ordinarily an incandescent electric light bulb which projects light through the usual lens system to produce the necessary beam of light of substantially uniform intensity over the rectangular area through which printing of the copy film 30 from the negative film 28 is accomplished. As previously stated above, this exposure beam of light passes into and through the superimposed films 28 and 30 in the exposure drum 32 but is halted by the opaque cylindrical periphery 36 of the drum 34 so that it does not go beyond that location but is reflected or deflected backward through the superimposed films 28 and 30 toward the housing 42.

The conventional film supplying and feeding mechanism, generally designated 50, shown in the upper portion of FIG. 1 above the novel full-width film-supporting and exposing arrangement 12, being conventional, is shown in abbreviated from in FIG. 1 whrerin the separate reels for holding and supplying the negative film 28 and copy film 30 are omitted. Only the guide spools or sprockets 52 and 54 mounted on their respective axes of shafts 56 and 58 are shown for guiding the negative film 28 downward to the exposure zone 32. Similarly, only the guide spools or sprockets 60 and 62 mounted on their respective axes or shafts 64 and 66 are shown for guiding the copy film 30 into and through the exposure zone 32.

Below the exposure zone 32, the negative film 28 is guided by guide spools or sprockets 68 and 70 mounted on their respective axes 72 and 74 before it passes over the sprocket wheel 76 and thence onto the conventional negative film receiving reel (not shown). Similarly, below the exposure zone 32, the now printed copy film 30, after exposure, is stripped away from the negative film 28 and sprocket 24 by the combined film supporting and stripping drum 34 of larger diameter on its separate shaft 18 and thence passes over the guide spools or sprockets 78 and 80 on their respective axles or shafts 82 and 84. The copy film 28 now passes over the sprocket wheel 76 along with the negative film 28, both films 28 and 30 being retained upon the periphery of the sprocket wheel 76 by a pressure wheel 86. Below the sprocket wheel 76 the negative film and copy film 28 and 30 proceed onward to separate receiving reels (not shown) or the copy film 28 to developing apparatus and solutions wellknown to those who use the conventional motion picture film printing machines of which the present invention is an improvement, for reasons stated above.

Figure 2:
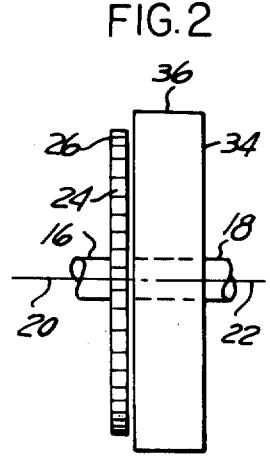
FIG. 2 is a fragmentary rear elevation of the portion of the machine looking in the direction of the arrows 2—2 in FIG. 1 and showing the film driving sprocket and full-width film supporting and stripping drum rotatable therein upon different axes of rotation with the films omitted therefrom.
Figure 3:
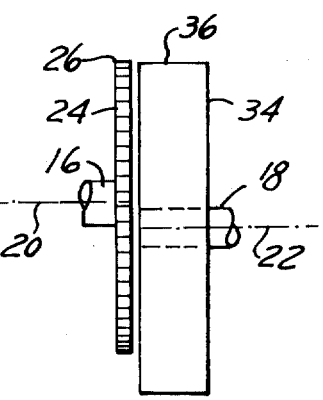
FIG. 3 is a fragmentary top plan view of the portion of the machine shown in FIG. 2.

The operation of the invention is believed to be sufficiently described in connection with the description of the structure thereof as set forth above, hence is believed to require only a short explanation. In operation, the separate supply reels (not shown) containing the negative film 28 and the as yet unexposed copy film 30 are mounted on their respective axles (not shown) in the uppermost portion of FIG. 1. Their respective negative and copy films 28 and 30 are then threaded around their respective above-described guide spools or sprockets through the exposure zone 32 where they are supported throughout their full widths by the cylindrical periphery 36 of the supporting and stripping drum 34. At this location, the films 28 and 30 are driven by the teeth 26 of the rotating drive sprocket 24 (FIG. 2) engaging the superimposed perforations along the edges of the films 28 and 30.

While the negative and copy films 28 and 30 are thus driven and passed through the exposure zone 32, they are subjected to illumination from the illuminating system 40 which produces a beam of light passing along the optical axis of the optical system 40. As stated above, the light after passing through the negative film 28 and copy film 30 and subjecting the latter's emulsion to exposure, is blocked from further advancement by the peripheral surface 36 of the combined supporting and stripping drum 34, the opacity of which obstructs the further passage of the light but reflects or deflects the light reversely back toward the illuminating system 40. The films 28 and 30, although traveling as much as 200 to 700 feet per minute, are nevertheless prevented from intermittently moving away from one another while they are passing through the exposure film 32, because they are supported horizontally and vertically throughout their full widths as well as vertically in their arcuate paths around the periphery 36 of the drum 34 and completely thereacross. As a result, the films 28 and 30, while passing through the exposure zone 32 cannot move apart from one another intermittently as has hitherto occurred in conventional motion picture printing machines wherein the films are supported only along their opposite edges. Consequently, the images of the negative film 28 remain sharply imprinted upon the copy film 30, without the fuzziness or poorly focussed areas characteristic of such insufficiently supported film of prior printing machines.

After exposure of the film 30 from the negative film 28 by the light from the illuminating system 40 has taken place in the exposure zone 32, the films 28 and 30 are separated from one another by the cooperative action between the combined supporting and stripping drum 34 and the drive sprocket 24 rotating upon their separate shafts 16 and 18 upon spaced parallel axes of rotation 20 and 22. After such separation, the films 28 and 30 pass around their respective guide spools or sprockets 68, 70, 78, and 80 and around their common sprocket wheel 76 onto separate receiving reels (not shown), whence the exposed but as yet undeveloped copy film 30 is developed in the usual developing and fixing baths as is well known to those skilled in the motion picture processing art.

I claim:

1. An improved film-width-supporting, driving, and stripping arrangement for superimposed edge-perforated negative and positive films adapted to replace the conventional film-edge-supporting and stripping arrangement in a conventional motion picture film printing machine having power-driven mechanism operatively connected to film-supplying and film-receiving devices disposed respectively preceding and succeeding a film exposure zone disposed adjacent said conventional film-edge-supporting and stripping arrangement and illuminated by an optical illuminating system, said improved arrangement comprising
   - an arrangement-carrying structure adapted to be mounted adjacent said film-exposure zone,
   - a rotary film drive sprocket rotatably mounted on said structure and drivingly connected to said power driven mechanism and rotatable on a first axis of rotation with a portion of its periphery disposed substantially in said film-exposure zone and having film-driving teeth adapted to project into the edge perforations of the superimposed negative and positive film fed thereto from said film-supplying devices, - and a rotary film-supporting and stripping element of greater diameter than said drive sprocket rotatably mounted on said structure upon a second axis of rotation disposed in spaced parallel relationship to said first axis of rotation and having a periphery with a portion thereof disposed in said film-exposure zone adjacent to and in lateral alignment with said sprocket peripheral portion and having a width adapted to extend across said support substantially the entire width of said superimposed films exclusive of their respective perforations.

2. An improved film-width-supporting, driving, and stripping arrangement, according to claim 1, wherein a sprocket drive shaft is rotatably mounted on said arrangement-carrying structure coaxial with said first axis of rotation, and wherein said film drive sprocket is mounted on and drivingly connected to said sprocket drive shaft.

3. An improved film-width-supporting, driving, and stripping arrangement, according to claim 1, wherein said rotary film-supporting and stripping element comprises a wheel with a substantially cylindrical surface on its periphery.

4. An improved film-width-supporting, driving, and stripping arrangement, according to claim 1, wherein said rotary film-supporting and stripping element is mounted for free rotation upon said second axis of rotation.

5. An improved film-width-supporting, driving, and stripping arrangement, according to claim 1, wherein a film-supporting stripping-element-supporting shaft is mounted on said arrangement-carrying structure coaxial with said second axis of rotation, and wherein said film-supporting and stripping element is rotatably mounted upon said last-mentioned shaft.

6. An improved film-width-supporting, driving, and stripping arrangement, according to claim 5, wherein said film-supporting and stripping element is mounted for free rotation on said film-supporting and stripping-element-supporting shaft.

7. An improved film-width-supporting, driving, and stripping arrangement, according to claim 6, wherein said film-supporting element comprises a wheel with a substantially cylindrical surface extending over substantially the entire width of its periphery.

* * * * *